Nov. 1, 1966   M. PIERAZZUOLI   3,282,611
COUPLING DEVICE
Filed Jan. 24, 1964
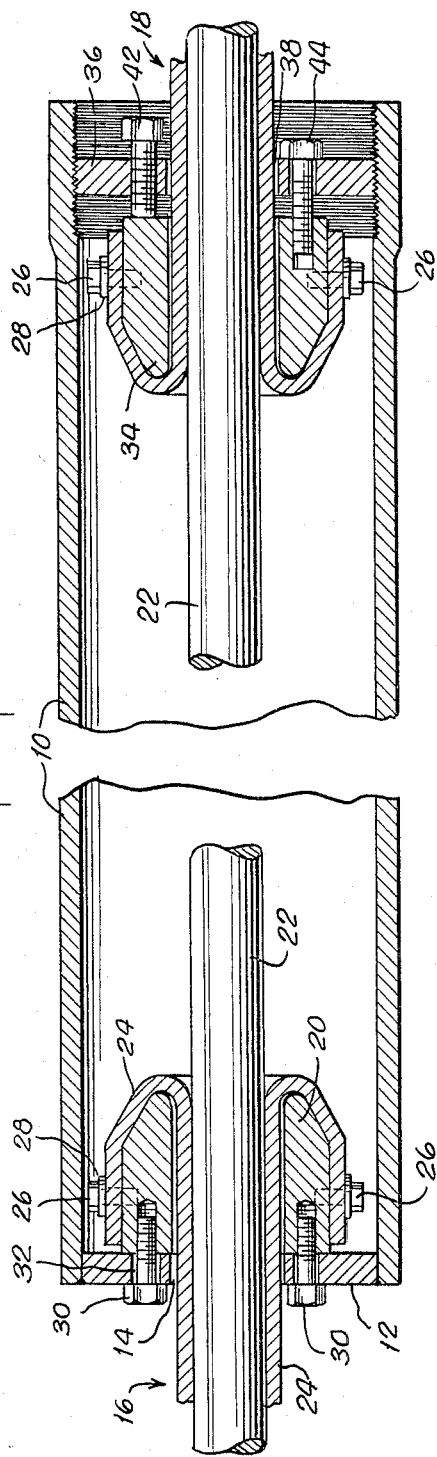
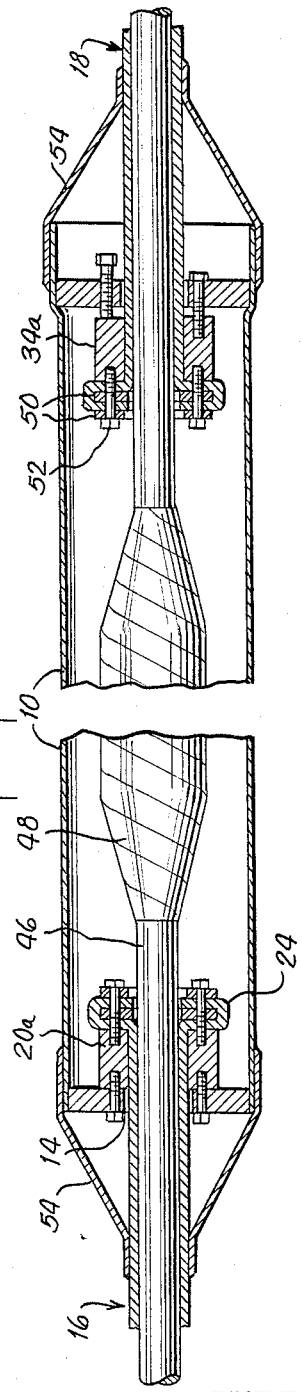
INVENTOR.
MARIO PIERAZZUOLI
BY
Ward, Neal, Haselton, Orme & McElhannon
ATTORNEYS

United States Patent Office 3,282,611
Patented Nov. 1, 1966

3,282,611
COUPLING DEVICE
Mario Pierazzuoli, Milan, Italy, assignor to Pirelli Societa Per Azioni, Milan, Italy, a corporation of Italy
Filed Jan. 24, 1964, Ser. No. 340,102
Claims priority, application Italy, Feb. 9, 1963, 2,752/63
10 Claims. (Cl. 285—45)

This invention relates to the joining of elongated bodies and more particularly it concerns a connecting device for fastening together the outer coverings of cables or conduits.

Many elongated bodies such as electric power cables, telephone cables and tubes or conduits for conveying liquids, and gases, particularly those which are intended to be laid under water, are provided with an outer sheath or armor (constituted, for example, by wires or metallic structural shapes longitudinally or helically disposed on the outer surface of the elongated body). The purpose of this armor is to absorb the longitudinal tension producing forces to which the elongated body is normally subjected. Such tension forces may be produced by the weight of the body itself, as during laying or recovery operations. This armor, moreover, may have the additional function of protecting the elongated body against possible damage which might be occasioned by the incidental contact with anchors, trawl nets and the like.

Because of the recognized impossibility of providing an elongated body in the form of a single unitary cable or conduit with a desired length, it is often necessary to join two or more lengths of such cable or conduit. In making these joints, it is necessary to insure the continuity of all component parts. Consequently, besides maintaining electrical continuity, as in the case of electrical cable, or hydraulic continuity as in the case of fluid conduits, it is necessary also to maintain a mechanical continuity along the protective armor surrounding the cable or conduit.

In general, the two ends of the armor of successive sections to be joined are secured to a metallic outer sleeve. This sleeve forms a joint covering which encloses and protects the inner elements making up the joint. The sleeve is of rigid material and acts to transmit stresses by means of tie rods and bolt flanges which extend about the outer periphery of the joint. These projections often give rise to certain difficulties, as they can easily become involved with anchors or trawl nets which, if dropped by ships of considerable tonnage, can exert excessive stresses on the joint and can drag it to such an extent as to damage both the cable and the joint itself.

According to the present invention there is provided a joint which is not likely to become entangled inadvertently by trawl nets or anchors as a result of projections or considerable over-all dimensions.

The present invention provides a device for joining the armor of elongated bodies, where such armor is constituted by wires or by metallic structural members. Such joining device comprises a cylindrical sleeve devoid of projections, having a minimal radial size and through which are transmitted the tension stresses in the outer sheath or armor the joined sections. Inside the cylindrical sleeve, the end of the armor surrounding each joined length of cable or conduit is folded about a respective one of two annular shaped elements and then secured thereto. The annular shaped elements are mutually displaced within the cylindrical sleeve and are movable toward and away from each other within the sleeve by means of adjustable connecting screws which contact rings secured to each end of the sleeve.

The improved connecting device of the present invention will be more fully described with reference to the attached drawing in which:

FIG. 1 is a longitudinal section, partially broken away, showing a joint constructed according to the present invention, and FIG. 2 is a longitudinal section, similar to that shown in FIG. 1, but further illustrating terminal sections associated with the device.

The novel joint, as shown in FIG. 1, comprises a cylindrical sleeve 10, having provided at one of its ends a first ring 12, rendered integral therewith by casting or by welding. The first ring 12 is pierced as at 14 in order to allow free passage of the end of one of two elongated bodies 16 and 18 to be joined. Against the first ring 12, and inside the cylindrical sleeve 10 there rests a first annular shaped element 20. One end of the first elongated body 16 enters through the first ring 12 and the first annular shaped element 20. In the embodiment shown, the elongated body 16 has a central core 22 which is joined to a corresponding core 22, on the second elongated body 18 being joined thereto. Each of the elongated bodies 16 and 18 are provided with an outer metallic armor 24 formed of wires or other elements. This armor protects the core and absorbs the various longitudinal stresses to which the elongated body is subjected. The armor 24 is folded back over and secured to the annular shaped element 20. Such securing, as shown in FIG. 1, may be achieved by means of screws 26 which press against the wires or other structural components of the armor 24 through suitable washers 28. This fastening system has the advantage of providing a safe anchorage, one which may easily be disassembled, and one which permits a reduced radial size in the cylindrical sleeve 10.

The first annular shaped element 20 is interconnected with the first ring 12, and thus also with the cylindrical sleeve 10, through a plurality of connecting screws 30 which extend through openings 32 circularly disposed about the pierced opening 14 in the first ring 12. These screws then threadedly engage the first annular shaped element 20. This affords a stable assembly even if tension stresses between the elongated bodies being connected happen to be lacking.

At the opposite end of the cylindrical sleeve 10 there is provided a second annular shaped element 34 similar to the first annular shaped element 20, and on to which the wires or other metallic elements constituting the armor 24 of the second elongated body 18 to be joined to the first elongated body 16, are fastened in the manner above described. There is also provided at the opposite end of the cylindrical sleeve 10 a displaceable ring 36, against which the second annular shaped element 34 rests. The displaceable ring 36 is similar in shape to the first ring 12, being also pierced as at 38, but is screwed into rather than fastened solidly to the cylindrical sleeve 10, and is thus longitudinally displaceable by rotation within the sleeve. A plurality of spacing or tension adjusting screws 42 are threadedly engaged with and extend through the displaceable ring 36 in a circular pattern about its axis. The ends of these screws abut against the second annular shaped element 34. By tightening the screws it is possible to vary the distance between the second annular shaped element 34 and the displaceable ring 36, and therefore the distance between the first and second annular shaped elements 20 and 34. This allows the cylindrical sleeve 10 to be adjusted to any desired tension so that the longitudinal tension stresses to which the two connected lengths of armor are subjected may be transmitted through the cylindrical sleeve 10. Interspersed among the spacing or tension adjusting screws 42 at the opposite end of the cylindrical sleeve are a plurality of connecting screws 44 similar to the connecting screws 30 at the first end of the sleeve 10. These connecting screws extend through the displaceable ring 36 and are threadedly engaged in the second annular shaped element 34, thus serving to prevent the annular shaped element from shifting uncontrollably within the cylindrical sleeve 10 should all tension be removed from the elongated bodies being connected.

FIG. 2 shows a joint constructed according to the present invention, and joining a pair of elongated bodies having electrical cable cores 46, which are joined and covered with an insulating material 48 within the cylindrical sleeve 10. The juncture of these cores is relieved of tension as in the embodiment of FIG. 1 by being completely absorbed in the cylindrical sleeve 10.

An alternate fastening system, utilizing labyrinth guides, is also shown in FIG. 2. In this alternate system the end of the outer armor 24, instead of being folded back over the annular shaped elements 20 and 34, is bent inwardly and outwardly so that it becomes interspersed or woven among several stacked rings 50 which are positioned in alignment with the annular shaped elements. Fastening screws 52 are passed through each of the stacked rings 50 and the corresponding folds of the end of the outer armor, and are secured to the end of the annular shaped elements 20a and 34a. This method of fastening provides for additional surface contact between the outer armor and the joint itself, thus reducing the likelihood of stress concentrations within the joint.

In assembling the devices shown in FIGS. 1 and 2, the cylindrical sleeve 10 is first joined with the first ring 12 as by welding or other well known means. Then the first of the elongated bodies 18 is passed through the pierced opening 14 in the first ring 12 and the armor 24 surrounding the body is caused to be folded over and attached to the first annular shaped element 20 as described. The displaceable ring 36 and the second annular shaped element 34 are then passed over the second elongated body 18 and the armor 34 thereof is folded back over and attached to the second annular shaped element 34 in similar manner.

At this point in the joining operation the cores 22 or 46 of the two elongated bodies 16 and 18 are connected in conventional manner. The displaceable ring 36 is then screwed into the right end of the cylindrical sleeve 10 until it comes up against the second annular shaped element 34. At this point the spacing or tension adjusting screws 42 are tightened up against the rear portion of the second annular shaped element 34 until the desired tension is imported to the cylindrical sleeve 10.

For certain situations it may be desired to provide, as shown in FIG. 2, frusto-conical sleeves 54 which extend over the ends of the cylindrical sleeve 10 and down against the armor 24 of each of the elongated bodies being connected. This serves to protect the various adjustable elements exposed at the end of the cylindrical sleeve and further serves to render the joint less susceptible to snagging.

Although particular embodiments of the invention are herein disclosed for purposes of explanation, further modifications thereof, after study of this specification, will be apparent to those skilled in the art to which the invention pertains. References should accordingly be had to the appended claims in determining the scope of the invention.

What is claimed and desired to be secured by Letters Patent is:

1. A device for joining together the armor covering two metallic bodies, said device comprising a cylindrical sleeve having a substantially smooth outer surface and capable of withstanding tensile stresses to which such metallic bodies may be subjected, a pair of annular shaped elements disposed within said cylindrical sleeve, each annular shaped element having extending therethrough folded thereabout, and fastened thereto the armor at the end of a respective one of said elongated bodies in a manner leaving the outwardly facing surfaces of the annular shaped elements exposed, said annular shaped elements being interconnected with said cylindrical sleeve by means of end rings secured to each end of said sleeve and enclosing said annular shaped elements connecting screws extending between the exposed outer surface of each annular shaped element and a corresponding one of said end rings.

2. The device described in claim 1 wherein one of said end rings is threadedly engaged in said cylindrical sleeve for axial movement by rotation in said sleeve and wherein said ring carries spacing screws threadedly engaged therein and abutting its corresponding annular shaped element, the other annular shaped element being attached to the other end ring by means of connecting screws.

3. The device described in claim 1 further including frusto-conical sleeves extending from each end of the cylindrical sleeve down to the armor covering the respective elongated bodies.

4. A device for coupling together the ends of two armor covered elongated bodies, said device comprising a tubular outer sleeve having a smooth exterior, a pair of annular shaped elements disposed in axial alignment within said outer sleeve, means securing the end of the armor covering of said elongated bodies to a respective one of said annular shaped elements in a manner leaving the outwardly facing surfaces of the annular shaped elements exposed, a pair of end rings fixed to the ends of said outer sleeve outside said annular shaped elements, said end rings having an inner diameter larger than the outer diameter of the armor on said elongated bodies and smaller than the diameter of said annular shaped elements, and adjustable spacer means between at least one of said end rings and the exposed outer surface of a corresponding one of said annular shaped elements.

5. The device defined in claim 4 wherein said spacer means comprises screws extending through and threadedly engaged with one of said end rings and abutting the end of a corresponding annular shaped element.

6. The device defined in claim 4 wherein one of said end rings is threadedly engaged in said hollow cylindrical outer sleeve for axial movement by rotation therein.

7. The device defined in claim 4 further including frusto-conically shaped sleeves extending downwardly from each end of said outer sleeve to the outer surface of the respective armor covered elongated bodies being connected.

8. A device for coupling together the ends of two armor covered elongated bodies, said device comprising a tubular outer sleeve having a smooth exterior, a pair of annular shaped elements disposed in axial alignment within said outer sleeve, means maintaining the end of the armor covering each of such two elongated bodies in an arrangement extending through and folded back over each of said annular shaped elements respectively and leaving exposed the outwardly facing surfaces of said annular shaped elements, a pair of end rings fixed to the ends of said outer sleeve outside said annular shaped elements, said end rings having an inner diameter larger than the outer diameter of the armor on said elongated bodies and smaller than the diameter of said annular shaped elements, and adjustable spacer means between at least one of said end rings and the exposed outer surface of a corresponding one of said annular shaped elements.

9. A device for coupling together the ends of two armor covered elongated bodies, said device comprising a tubular outer sleeve having a smooth exterior, a pair of annular shaped elements disposed in axial alignment within said outer sleeve, means maintaining the end of the armor covering each of said elongated bodies in an arrangement extending through and folded out and in so as to be sandwiched among the inwardly facing ends of said annular shaped elements and ring elements axially aligned therewith and located therebetween, thus leaving exposed outwardly facing surfaces of said annular shaped elements, a pair of end rings fixed to the ends of said outer sleeve, said end rings having an inner diameter larger than the outer diameter of the armor on said elongated bodies and smaller than the diameter of said annular shaped elements, and adjustable spacer means between at least one of said end rings and the exposed outer surface of a corresponding one of said annular shaped elements.

10. A device for coupling together the ends of two armor covered elongated bodies, said device comprising a tubular outer sleeve having a smooth exterior, means securing the end of the armor covering of each of said elongated bodies to a respective one end of said outer sleeve, at least one of said means including an annular shaped element disposed in axial alignment with said outer sleeve, and constructed to accommodate passage therethrough of one of said elongated bodies and for securing thereto the folded back armor covering of said one body in a manner leaving the outwardly facing surface of said annular shaped element exposed, an end ring secured to said outer sleeve outside said annular shaped elements, said end ring having a central opening therethrough for accommodating passage of said one elongated body, said central opening being smaller in diameter than the diameter of said annular shaped element and adjustable spacer means between said end ring and the exposed outer surface of said annular shape.

References Cited by the Examiner

UNITED STATES PATENTS 2,877,031   3/1959   Lee _____ 174—89 X

FOREIGN PATENTS 1,185,327   2/1959   France.
969,216   5/1958   Germany.
175,826   3/1922   Great Britain.

CARL W. TOMLIN, *Primary Examiner.*

D. W. AROLA, *Assistant Examiner.*